(12) United States Patent
Nagatsuka

(10) Patent No.: US 7,516,464 B2
(45) Date of Patent: Apr. 7, 2009

(54) OPTICAL PICKUP DEVICE EQUIPPED WITH TILT ADJUSTING MECHANISM

(75) Inventor: Osamu Nagatsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 596 days.

(21) Appl. No.: 10/787,083

(22) Filed: Feb. 27, 2004

(65) Prior Publication Data
US 2004/0174780 A1    Sep. 9, 2004

(30) Foreign Application Priority Data
Mar. 3, 2003    (JP) ............................. 2003-055775

(51) Int. Cl.
G11B 7/00    (2006.01)
(52) U.S. Cl. ..................................... 720/683
(58) Field of Classification Search ................. 720/683
See application file for complete search history.

(56) References Cited

U.S. PATENT DOCUMENTS 4,942,562 A * 7/1990 Suzuki .................... 369/44.11
5,164,936 A * 11/1992 Kagami ....................... 720/684
5,216,648 A * 6/1993 Noda et al. ............... 369/44.14
5,488,603 A * 1/1996 Tomita et al. ................ 720/683
2002/0172109 A1* 11/2002 Fujita ....................... 369/44.16

FOREIGN PATENT DOCUMENTS

| JP | 08-249695 | 9/1996 |
| JP | 09-022537 | 1/1997 |

* cited by examiner

Primary Examiner—David D Davis
(74) Attorney, Agent, or Firm—Fitzpatrick, Cella, Harper & Scinto

(57) ABSTRACT

Disclosed is an optical pickup device which is small, light, and thin and which is equipped with a tilt adjusting mechanism. A lens holding body holding an objective lens and a support body supporting the lens holding body so as to allow the lens holding body to move in the focusing direction and/or the tracking direction of the objective lens, are supported at two support points on a support body mounting surface of an optical base so as to be rotatable around an axis extending in a tangential direction of an optical disk.

15 Claims, 8 Drawing Sheets

OPTICAL PICKUP DEVICE EQUIPPED WITH TILT ADJUSTING MECHANISM

BACKGROUND OF THE INVENTION

1. Field of the Invention

The present invention relates to an optical pickup device for optically recording information on an optical disk and/or reproducing information from the optical disk.

2. Related Background Art

In an optical pickup device, the objective lens is driven in two axial directions: a direction perpendicular to the optical disk (hereinafter referred to as "focusing direction") and a disk radial direction (hereinafter referred to as "tracking direction"). This driving of the objective lens is effected in order to correct focusing deviation due to vertical movement of the recording surface attributable to warpage of the optical disk, side-runout of the spindle motor for rotating the optical disk, etc., and tracking deviation due to eccentricity of the optical disk, eccentricity of the chucking portion for connecting the optical disk to the spindle motor, etc. In an optical disk recording and/or reproducing apparatus (hereinafter referred to as "optical disk recording-reproducing apparatus") including the above optical pickup device, the optical disk can warp since it is formed of a resin such as polycarbonate. When the disk has any warpage, it generates inclination of the optical axis of the objective lens with respect to the disk surface (hereinafter referred to as "tilt"). Due to the inclination of the optical axis with respect to the optical disk, upon light incidence, an optical aberration is generated, which leads to deterioration in the signal at the time of recording and reproduction. In view of this, tilt control is generally conducted, in which the inclination of the optical disk with respect to the optical axis of the objective lens is detected by an optical sensor or the like and the objective lens is inclined by that inclination amount for angular correction.

As a tilt driving method for a conventional tilt control device, there has been proposed a method in which, as disclosed, for example, by Japanese Patent Application Laid-Open No. H9-22537, a lens holder is supported by four bar-shaped support members and in which there are provided four focusing coils and four tracking coils, the objective lens being driven by superimposing a tilt drive signal on a focusing drive signal. However, in the above-described conventional arrangement, not only is the magnetic circuit configuration rather complicated, but also the control is rather complicated and difficult due to the superimposition of the tilt drive signal on the focusing drive signal.

As a second conventional example to overcome this problem, there has been proposed a method, in which, as disclosed by Japanese Patent Application Laid-Open No. H8-249695, the entire optical pickup device is rotatably mounted on a carriage and in which the guide shaft of the carriage is rotated by a motor to tilt drive the optical pickup device, which is connected to the guide shaft by a gear.

However, the construction of the above second conventional example has a problem in that the carriage including the optical pickup device has to be rather large, making it impossible to meet the recent requirement for a reduction in the size and thickness of optical disk recording-reproducing apparatuses.

SUMMARY OF THE INVENTION

The present invention has been made in view of the above-mentioned problems and it is an object of the present invention to provide an optical pickup device which has low power consumption, is small, light, and thin and which is mounted on a tilt correcting mechanism.

An optical pickup device according to the present invention includes:

an objective lens for condensing a light beam on an optical disk;

a lens holding body for holding the objective lens;

a support body for supporting the lens holding body so as to allow the lens holding body to move in at least one of a focusing direction and a tracking direction of the objective lens; and an optical base which is capable of moving in a radial direction of the optical disk and which holds the support body so as to allow the support body to rotate around a rotation axis perpendicular to the focusing direction and the tracking direction.

BRIEF DESCRIPTION OF THE DRAWINGS

FIG. 3A shows an initial state and FIG. 3B shows a state in which tilt drive has been effected;

DESCRIPTION OF THE PREFERRED EMBODIMENTS

Embodiments of the present invention will now be described in detail with reference to the drawings.

First Embodiment

Figure 1:
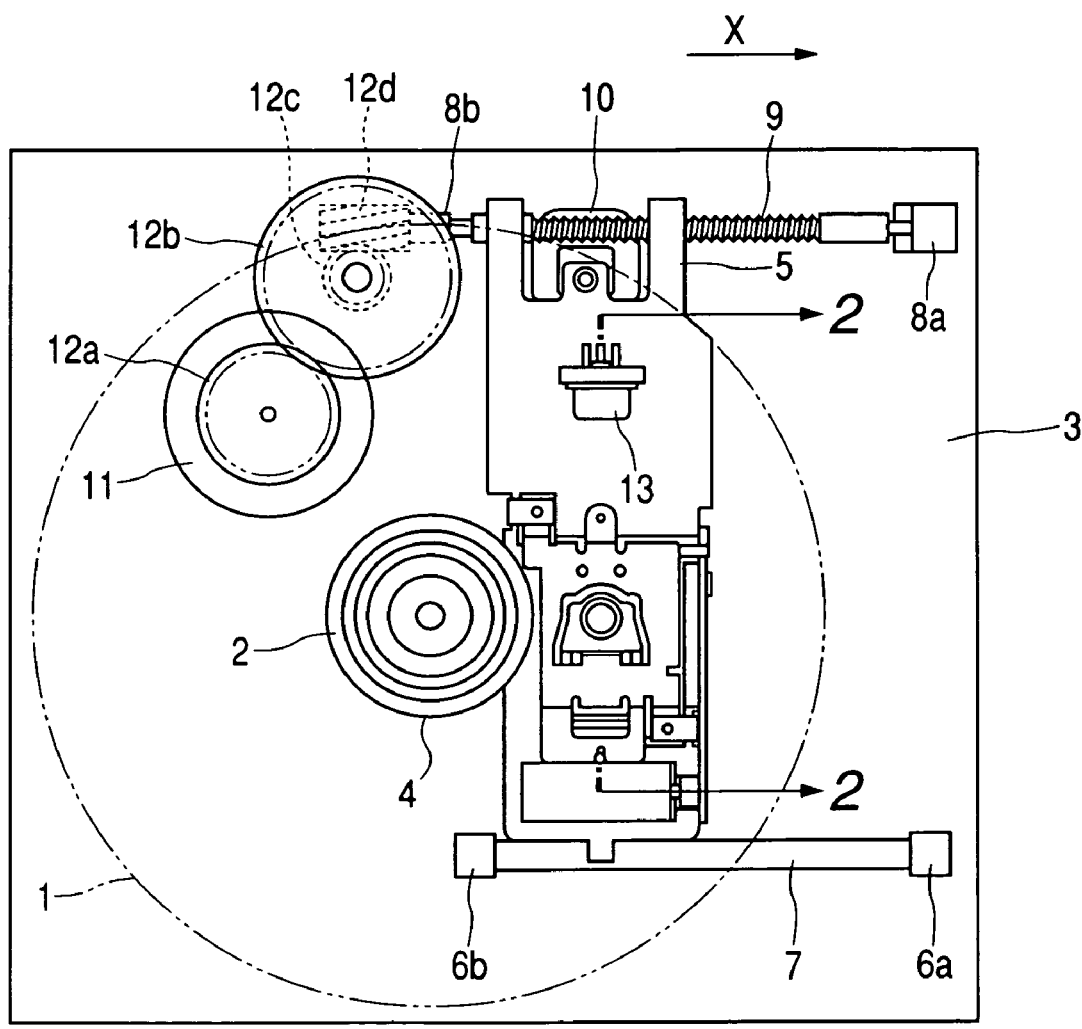
FIG. 1 is a plan view of an optical disk recording-reproducing apparatus according to a first embodiment of the present invention.

FIG. 1 is a plan view of an optical disk recording-reproducing apparatus according to a first embodiment of the present invention. In FIG. 1, a turntable 2, on which an optical disk 1 is to be mounted, is provided at the forward end of a spindle motor 4 installed on a chassis 3 constituting a base plate of a mechanism portion of the apparatus. An optical pickup device 5 is slidable in a radial direction (X-direction in FIG. 1) along the recording surface of the optical disk 1, using as guiding means a guide shaft 7 supported by guide shaft support members 6a and 6b provided on the chassis 3 and a lead screw 9 rotatably supported by lead screw support members 8a and 8b. The driving of the optical pickup device 5 is realized by a feeding drive mechanism in which (i) a rack gear 10, mounted to the back side of the optical pickup device 5 so as to extend in a direction perpendicular to the radial direction, is held in mesh with the lead screw 9 and (ii) a traverse motor 11 is driven to drive speed reduction gears 12a through 12d to thereby rotate the lead screw 9. At one end of the optical pickup device 5, there is provided a ⊐-shaped (U-shaped) protrusion, which is slidable while engaged with the guide shaft 7 as shown in FIGS. 3A and 3B.

Figure 2:
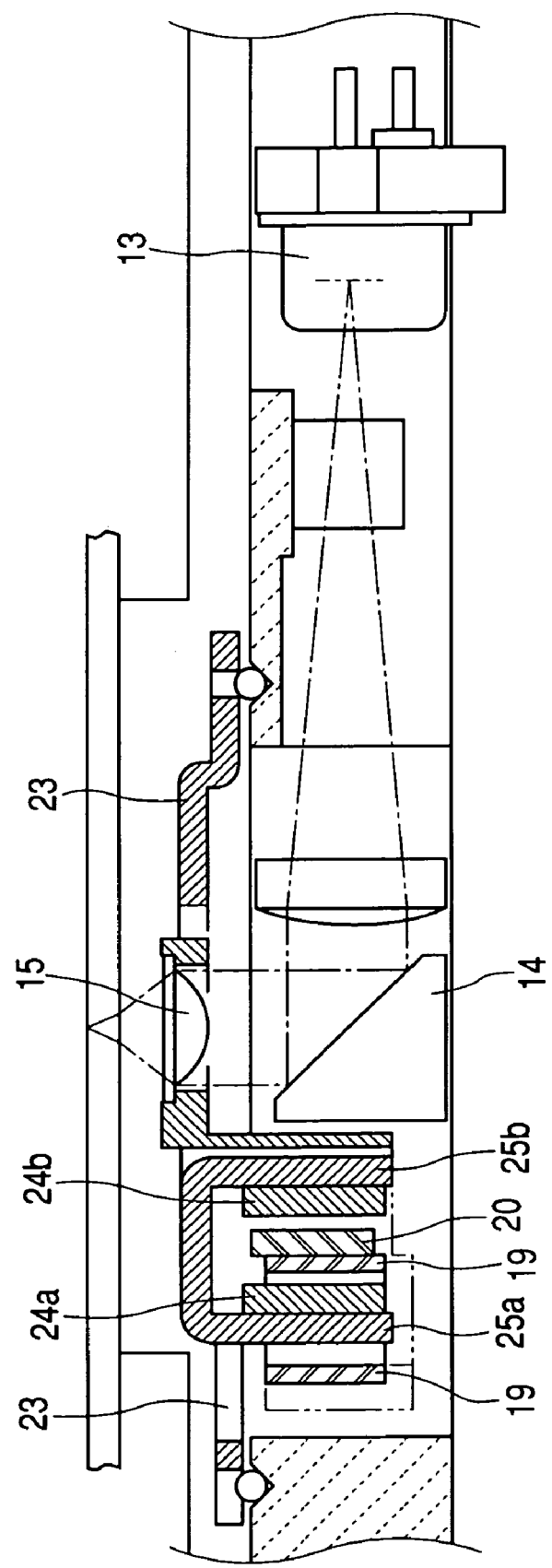
FIG. 2 is a sectional view taken in the line 2-2 of FIG. 1.

FIG. 2 is a sectional view of an optical component of the optical pickup device 5, taken in the line 2-2 of FIG. 1. FIGS. 3A and 3B are side views of a tilt drive mechanism 17, and FIG. 4 is an exploded perspective view of an actuator unit 16 and the tilt drive mechanism 17. In the optical pickup device 5, a semiconductor laser 13 serving as a light source is mounted on an optical base 28 constituting a base member. A beam emitted from the semiconductor laser 13 has its optical axis parallel to the disk and, after passing an optical system component (not shown), is reflected by a mirror 14 in a direction perpendicular to the optical disk 1, and passes through an objective lens 15, thereby being condensed on the recording surface of the optical disk 1. Further, there are mounted the actuator unit 16 for driving the objective lens 15 and the tilt drive mechanism 17 for rotating the entire actuator unit 16.

Figure 3A:
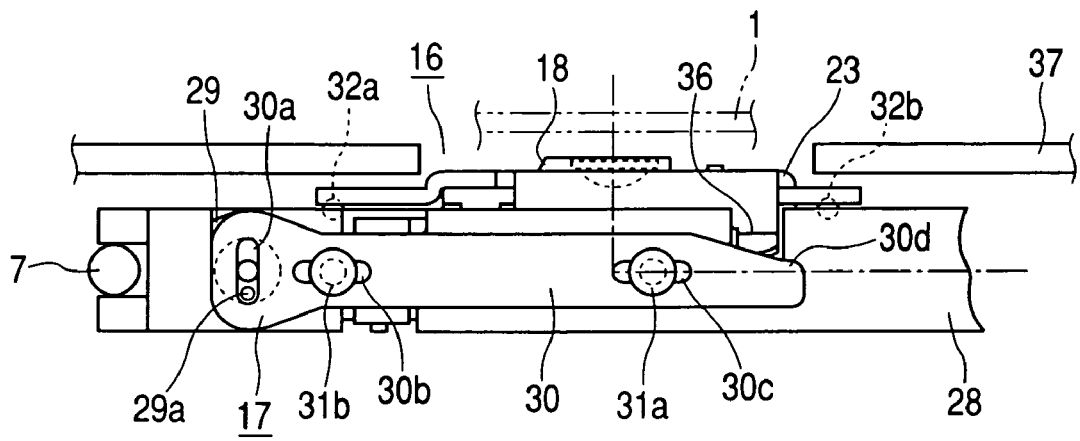
FIGS. 3A and 3B are side views of a tilt drive mechanism.
Figure 3B:
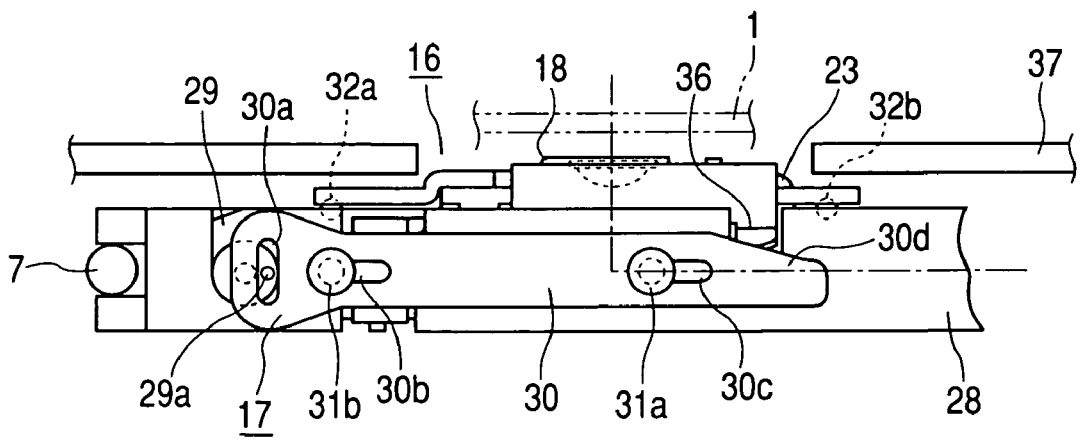
Figure 4:
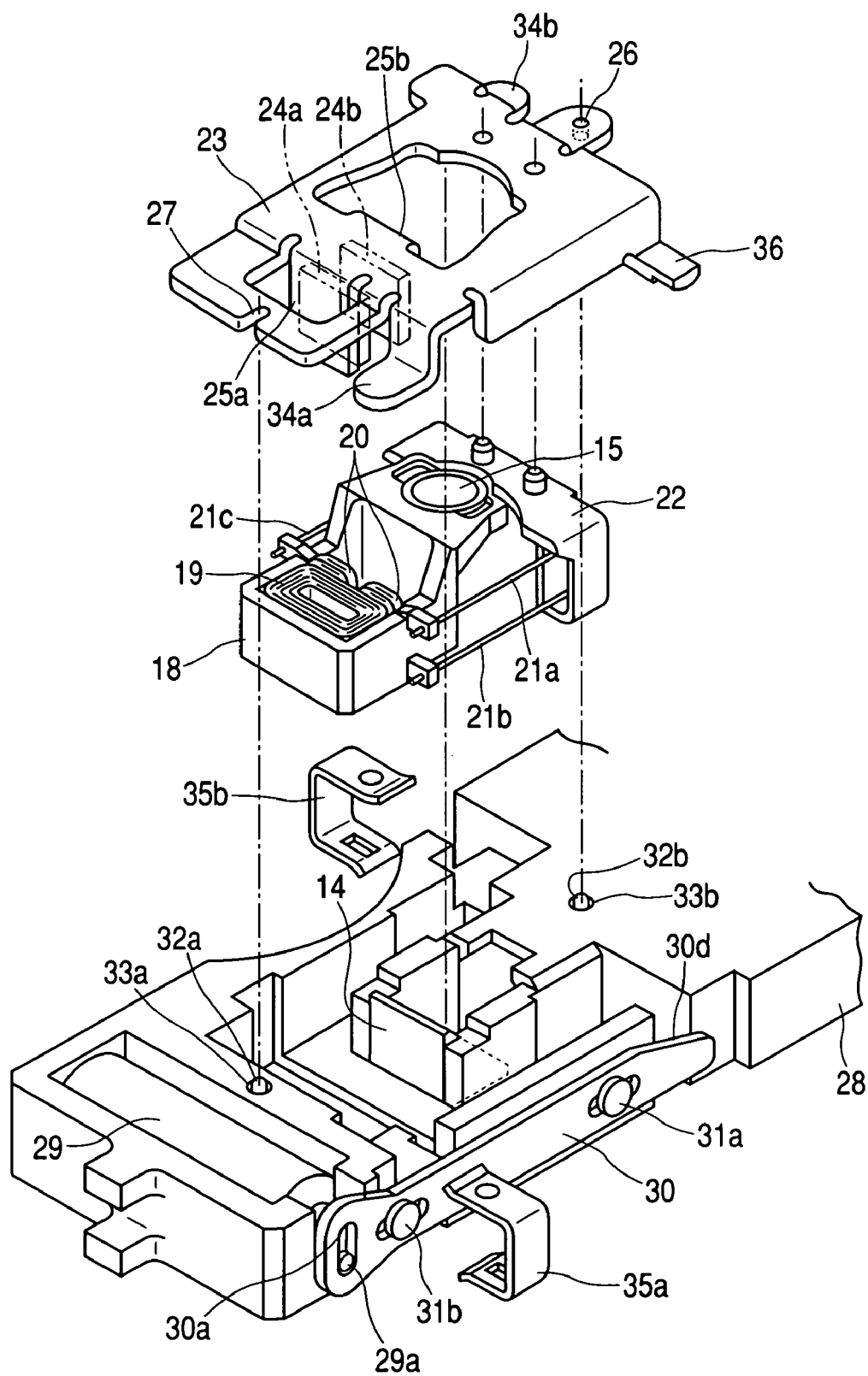
FIG. 4 is an exploded perspective view of an optical pickup device according to the first embodiment of the present invention.

In FIGS. 3A, 3B, and 4, the actuator unit 16 has the objective lens 15 and a lens holder 18 holding the objective lens 15. Firmly attached to the lens holder 18 is one focusing coil 19 wound and secured so as to be parallel to the optical axis direction of the objective lens, and a pair of tracking coils 20 arranged on a side surface of the focusing coil 19 and wound in a direction perpendicular to the focusing coil axis. The lens holder 18 is supported by four wire members 21a through 21d (the wire member 21d is not shown since it is situated on the back side of the lens holder 18), with the other end of each wire member being fixedly supported by a support member 22. The support member 22 is mounted to a yoke 23 constituting the base member of the actuator unit 16. While the yoke 23 constitutes the base member, it is also possible for a part of the base member to serve as the yoke, and the material of the base member may be different from that of the yoke. Here, the wire members 21a through 21d, the support member 22, and the yoke 23 constitute a support body for supporting the lens holder in the focusing direction (the optical axis direction of the objective lens) and in the tracking direction (the radial direction of the optical disk).

In the yoke 23 having permanent magnets 24a and 24b and opposing yoke portions 25a and 25b provided behind them, respectively, the permanent magnet 24a is provided at the inside position of the focusing coil 19 to be inserted into the focusing coil 19, and the permanent magnet 24b is provided at a position opposed to the tracking coil 20. The focusing coil 19, the tracking coil 20, the permanent magnets 24a and 24b, and the opposing yokes 25a and 25b constitute a magnetic circuit. Connected to the focusing coil 19 and the tracking coil 20 are the wire members 21a through 21d formed of a conductive material. By energizing each of them, it is possible for the entire lens holder 18, including the objective lens 15, to move in the focusing direction and in the tracking direction. That is, when electric current is caused to flow through the focusing coil 19, there is generated, due to the magnetic field generated by the permanent magnet 24a inserted into the focusing coil 19, a force which causes the entire lens holder 18 to move in the focusing direction, that is, a direction perpendicular to the optical disk. When electric current is caused to flow through the tracking coil 20, there is generated, due to the magnetic field generated by the permanent magnet 24b provided at the position opposed to the tracking coil 20, a force which causes the entire lens holder 18 to move in the tracking direction, that is, the radial direction of the optical disk.

Further, the yoke 23 has a hole portion 26 and a cutout portion 27, which constitute the rotation center of the actuator unit 16 and which are provided in the same straight line in the tangential direction of the optical disk 1.

The tilt drive mechanism 17 has a drive motor 29 on the optical base 28 and a yoke drive member 30 on a side surface of the optical base 28. At the forward end of the shaft of the drive motor 29, a drive pin 29a engaged with a cam groove 30a provided in the yoke drive member 30. The yoke drive member 30 is further equipped with guide grooves 30b and 30c, and its movement in the tangential direction is guided by two guide pins 31a and 31b provided on a side surface of the optical base 28. Further, at the other end of the yoke drive member 30, there is provided a yoke drive cam 30d.

In the upper surface of the optical base 28, on the side where the optical disk is arranged, there are provided two steel balls 32a and 32b arranged in a straight line and accommodated in conical holes 33a and 33b. The steel balls are engaged with the hole portion 26 and the cutout portion 27 provided on the yoke 27, whereby the actuator unit can rotate around an axis extending along the tangential direction. Further, the yoke 23 is equipped with urging spring receiving portions 34a and 34b. After the mounting of the yoke to the optical base 28, the urging spring receiving portions elastically are supported, between the yoke and the optical base 28 by ⊐-shaped (U-shaped) yoke urging springs 35a and 35b. The urging forces of the two yoke urging springs 35a and 35b are equivalent, and they constitute an aligning mechanism capable of maintaining the optical axis of the objective lens 15 of the actuator unit 16 at the center of a substantially vertical position. Further, the yoke 23 is equipped with a drive portion 36 whose contact portion has a rounded-shape (arcuate configuration) and which is in contact with the linearly inclined drive cam portion 30d of the yoke drive member 30.

The operation of the tilt drive mechanism constructed as described above will be illustrated. The optical pickup device 5, which is moved to an arbitrary position in the radial direction of the optical disk 1, detects tilting between the optical axis of the objective lens 15 and the surface of the optical disk 1, and generates a tilt control signal. In the state as shown in FIG. 3A, the drive motor 29 is rotated counterclockwise in accordance with the tilt control signal, and the drive pin 29a at the forward end of the shaft of the motor rotates, the cam 30a of the yoke drive member 30, which is engaged therewith, thereby sliding in the tangential direction. The yoke drive portion 36, which is in contact with the inclining portion of the drive cam portion 30d, rises with the sliding operation of the yoke drive member 30 to attain the state as shown in FIG. 3B. When, in the state as shown in FIG. 3A, the motor 29 rotates clockwise, the yoke drive member 30 moves in the reverse direction, and the yoke drive portion 36 descends, following the drive cam portion 30d. At this time, the yoke 23, that is, the actuator unit 16, rotates around a straight line passing the centers of the steel balls 32a and 32b on the optical base 28, thereby enabling the objective lens to make a tilt drive movement with respect to the radial direction. Through the above operation, the torque of the motor is converted to a reciprocating motion of the yoke drive member 30, and this reciprocating motion is converted to a vertical motion of the yoke drive portion 36. Even if the energization of the motor is stopped after this tilt drive, there is no fear of the actuator unit 16 being allowed to move freely since the inclination of the drive cam portion is sufficiently small. Thus, not only is it possible to conduct tilt correction reliably, but also there is no need to cause electric current to flow through the motor in order to maintain the actuator inclination, thereby achieving a reduction in power consumption.

Further, since the driving mechanism, such as the drive motor 29 and the yoke drive member 30, are arranged on a side of the actuator unit 16, there is involved no increase in the distance between the disk and the optical base, and it is possible to form the thin optical pickup device 5 despite the mounting of the tilt drive mechanism therein.

Further, since the rotation axis is arranged between the optical path parallel to the optical disk and the lower surface of a cartridge 37, that is, above the optical path, it is also possible to diminish the projection area of the optical pickup device 5.

The method of tilt detection, which is not described in detail here, is not an essential feature of the present invention, and various methods can be adopted in this regard. However, from the viewpoint of achieving a reduction in the size of the optical pickup device, it would be desirable to use, for example, a signal from a photodetector closely related to tilt. A stepping motor is suitable as the drive motor. In this regard, a stepping motor of a small diameter and with a large number of steps in its periphery is desirable since it can be driven for fine tilt angle adjustment.

Second Embodiment

Figure 6:
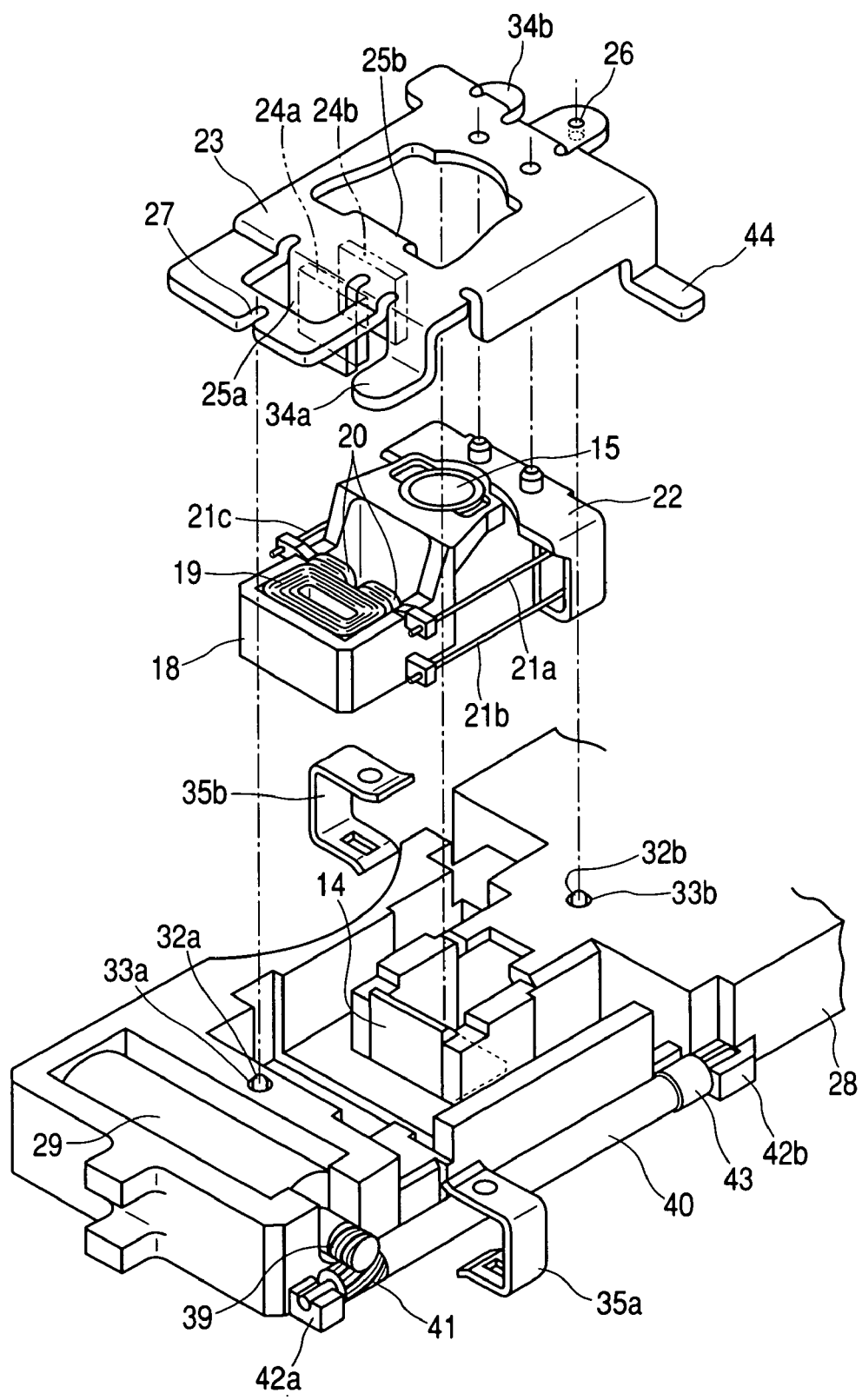
FIG. 6 is an exploded perspective view of an optical pickup device according to a second embodiment of the present invention.
Figure 7:
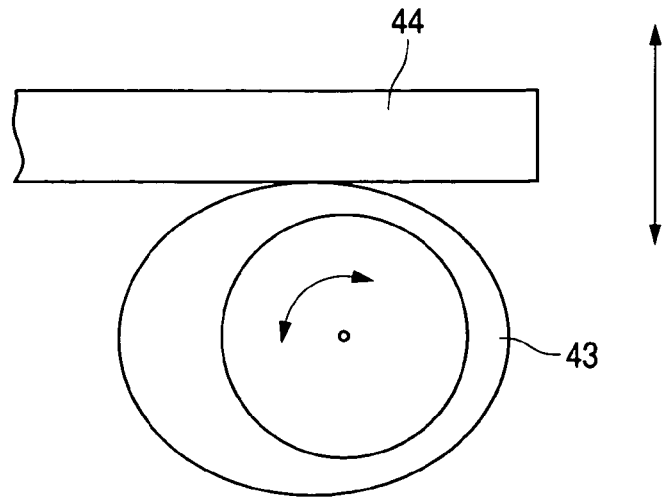
FIG. 7 is a diagram illustrating a vertical movement of a yoke drive portion 36 by an eccentric cam.

FIG. 6 is an exploded perspective view of an optical pickup device according to a second embodiment of the present invention. FIG. 7 is a diagram showing vertical movements of the yoke drive portion 36 by an eccentric cam. The components that are the same as those of the first embodiment are indicated by the same reference numerals, and a description of such components will be omitted. In this embodiment, the actuator unit 16 is substantially the same as that of the first embodiment. The difference of this embodiment from the first embodiment lies in the construction of the tilt drive mechanism 38. At the forward end of the shaft of the drive motor 29, there is provided a worm gear 39, which is in mesh with a helical gear 41 provided at one end of a yoke drive shaft 40 provided on a side surface of the optical base 28.

The yoke drive shaft is rotatably supported by bearing portions 42a and 42b. At the other end of the yoke drive shaft, there is provided an eccentric cam 43, which is in contact with the lower surface of a drive portion 44 of the yoke 23. As in the first embodiment, the yoke 23 is urged by the yoke urging springs 35a and 35b so as to be always in contact with the eccentric cam portion 43. As in the first embodiment, the drive motor 29 is rotated in accordance with a tilt control signal to rotate the worm gear 39 at the forward end of the motor shaft and the helical gear 41 of the yoke drive shaft which are in mesh with each other, and the drive portion 44 of the yoke 23 is caused to move vertically by the rotation of the eccentric cam portion 43. As a result, the yoke rotates around a straight line passing the centers of the steel balls 32a and 32b, thereby enabling the objective lens to perform tilt drive operation with respect to the radial direction. Due to the speed reduction mechanism formed by the worm gear 39 and the helical gear 41, finer tilt drive control is possible even if a stepping motor with the same number of steps as that in the first embodiment is used, thus achieving an improved accuracy in tilt adjustment. Further, the driving force of the drive motor 29 is reduced, thereby achieving a reduction in power consumption during motor drive.

Third Embodiment

Figure 9:
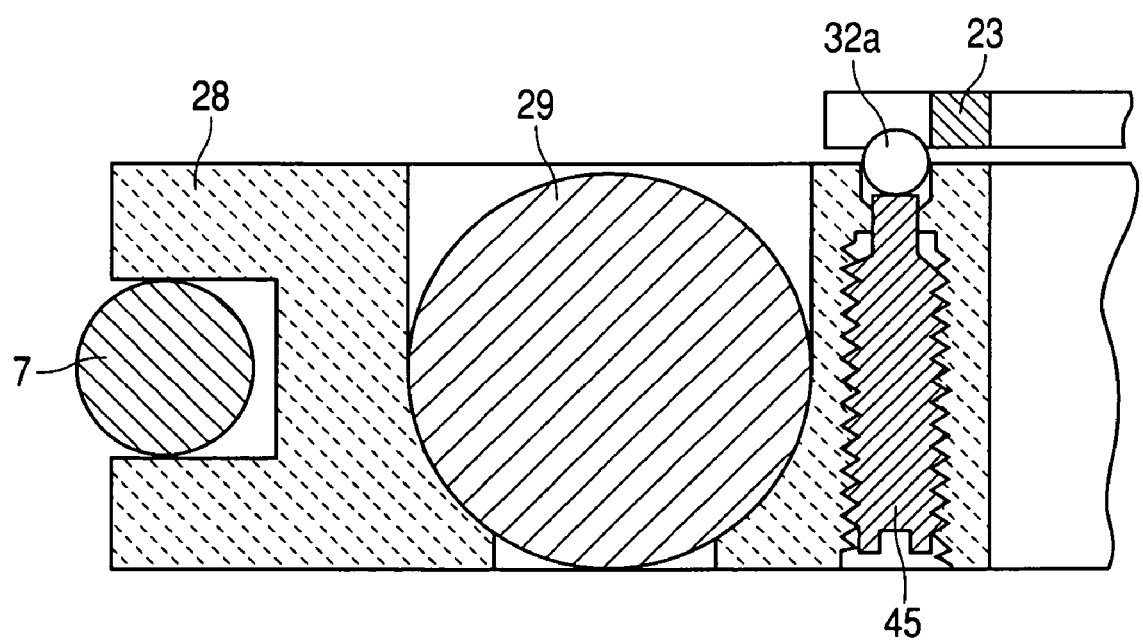
FIG. 9 is a sectional view of a main portion of an optical pickup device according to a third embodiment of the present invention.

FIG. 9 is a sectional view of a main portion of an optical pickup device according to a third embodiment of the present invention, taken in the tangential direction to show a steel ball constituting the rotation axis. The components that are the same as those of the first and second embodiments are indicated by the same reference numerals, and a description of such components will be omitted. In this embodiment, below the steel ball 32a constituting the rotation axis of the actuator unit in the first and second embodiments, there is provided a tangential tilt adjusting screw 45 capable of adjusting the height of the steel ball 32a in the direction of the optical axis of the objective lens. By rotating the tangential tilt adjusting screw 45 to the right or left, the steel ball 32a makes a vertical movement, thereby making it possible to adjust the tangential tilt of the yoke 23, that is, of the actuator unit 16.

That is, it is possible to adjust the height of at least one steel ball constituting the rotation axis of the actuator unit, whereby it is possible to provide a very simple and thin adjusting mechanism for tangential tilt adjustment as well.

In the above-described embodiments, the optical pickup device is moved to an arbitrary position on the optical disk by a traverse motor, and after tilt correction is effected based on a tilt detection signal, the focusing drive control and tracking drive control for the objective lens are performed by the actuator. Due to this construction, it is possible to cut off power supply to the motor after the tilt correction, thus making it possible to provide a tilt correction mechanism of low power consumption.

Further, to drive the yoke 23, two steel balls serving as support points are arranged at positions spaced apart from the optical path of the light applied to the optical disk by means of the objective lens, so that, as compared with the case in which the optical base (the optical pickup device) as a whole is rotated, the rotating portion is smaller, and the load of the drive portion thereof (motor or the like) is smaller, thereby achieving a reduction in size and weight. Further, the support points are arranged not inside the optical base but on the upper surface thereof, so that no increase in the thickness of the optical base is involved.

Figure 5:
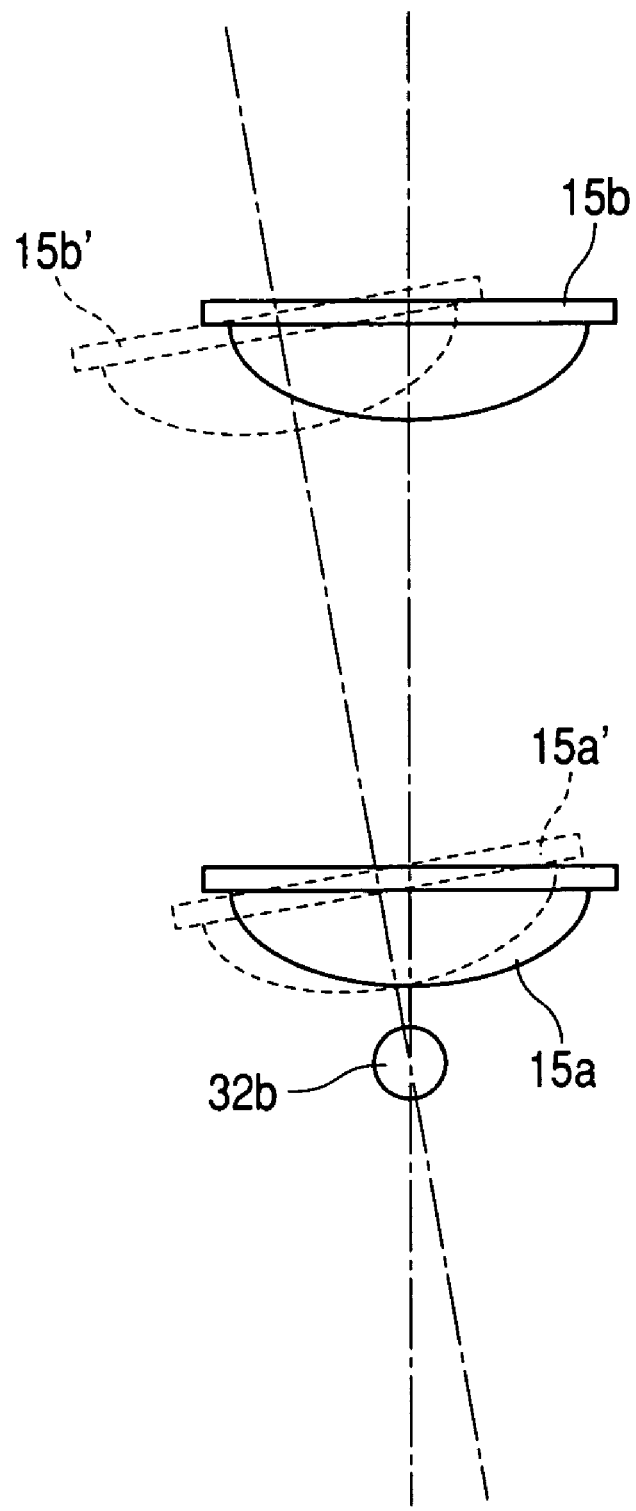
FIG. 5 is a diagram showing a state that the optical axis of an objective lens is shifted upon tilt drive.

The objective lens 15 is arranged in the vicinity of the rotation axis connecting the rotation support points formed by the steel balls 32a and 32b (it is naturally more desirable to arrange the objective lens on the rotation axis), so that it is possible to diminish the deviation of the optical axis. That is, as shown in FIG. 5, the nearer to the rotation axis (the steel ball 32b) the objective lens, which is mounted to the yoke 23 through the support member 22, is arranged, the smaller becomes the amount of displacement due to the rotation. This makes it possible to diminish the deviation of the optical axis. In FIG. 5, numerals 15a and 15a' indicate the objective lens arranged at a position near the rotation axis (the steel ball 32b), and numerals 15b and 15b' indicate the objective lens arranged at a position spaced apart from the rotation axis (the steel ball 32b). The positions indicated by numerals 15a' and 15b' are the positions of the objective lens after tilt drive control.

The drive motor 29 is mounted on the optical base in order to drive the yoke and is not mounted on the optical pickup device, so that, as compared with the case in which the entire optical pickup device is driven, it is possible to achieve a reduction in the load of the drive motor (a reduction in the size of the drive motor) and a reduction in the size of the drive transmission member, thereby making it possible to realize a reduction in the size of the optical disk apparatus as a whole.

By arranging the drive motor 29 such that its rotation shaft is parallel to the radial direction of the optical disk, it is possible to diminish the size of the optical base in the longitudinal direction (the tangential direction of the optical disk). Further, it is possible to achieve a reduction in the weight of the optical base, and to restrain the drive load of the optical base (the pickup device) (i.e., it is possible to restrain an increase in the moment from the guide shaft). Further, it is possible to diminish the size of the optical base in the lateral width direction (the radial direction of the optical disk) (in the case in which the rotation axis of the drive motor is arranged parallel to the tangential direction of the optical disk, it is arranged so as to be spaced apart from the optical path, so that the size in the lateral width direction of the optical base is increased), thereby making it possible to restrain an increase in the size of the optical pickup device.

By arranging the yoke drive member 30 and the yoke drive shaft 40 so as to be parallel to the tangential direction of the optical disk, it is possible to provide a thin optical pickup device with a tilt drive mechanism mounted thereon which only involves a slight increase in the size (width) of the optical pickup device in the disk radial direction by an amount corresponding to the size of the yoke drive member 30 and the yoke drive shaft 40, without involving any increase in the thickness of the optical base. As in this embodiment, it is desirable for the drive member to be provided on a side of the optical base so as not to increase the size of the optical base in the lateral width direction.

Figure 8A:
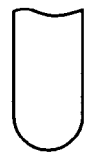
FIGS. 8A, 8B, and 8C are diagrams showing other construction examples of a support point.
Figure 8A:
Figure 8B:
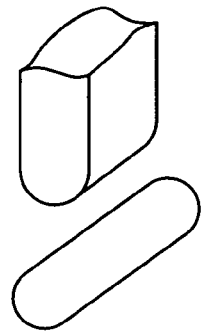
Figure 8C:
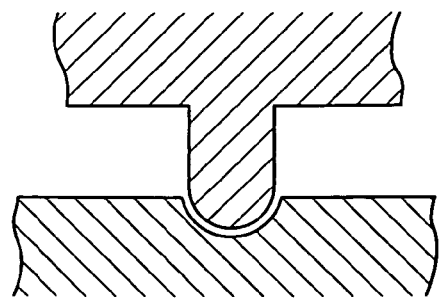

While in the above embodiments spherical members are used as support points, it is also possible to adopt other types of support points as long as they constitute a rotation axis. For example, as shown in FIGS. 8A to 8C, it is possible to provide, at two positions of the optical base or the yoke, protrusions with semi-spherical forward end portions (FIG. 8A) or protrusions with semi-cylindrical forward end portions (FIG. 8B), while providing the associated yoke or optical base with semi-spherical recesses (FIG. 8A) or semi-cylindrical recesses (FIG. 8B) to form the support points. FIG. 8C shows a state in which a semi-spherical protrusion and a semi-spherical recess are engaged with each other or a state in which a semi-cylindrical protrusion and a semi-cylindrical recess are engaged with each other.

What is claimed is:

1. An optical pickup device comprising:
   a light source;
   an objective lens for condensing a light beam on an optical disk;
   a lens holding body for holding the objective lens;
   a support body for supporting the lens holding body so that the lens holding body is movable in at least one of a focusing direction and a tracking direction of the objective lens with respect to the support body, the support body being constituted of wire members, a support member, and a yoke, wherein the lens holding body is supported by an end of the wire members, and wherein the other end of the wire members is supported by the support member; and
   an optical base which is capable of moving in a radial direction of the optical disk and which holds the light source and the support body so that the support body is rotatable, with respect to the optical base, around a rotation axis perpendicular to the focusing direction and the tracking direction.

2. An optical pickup device according to claim 1, wherein the support body is rotatably supported by at least two support points on an upper surface of the optical base on an optical disk side.

3. An optical pickup device according to claim 2, wherein the support body is supported by the optical base such that the lens holding body is situated inside the optical base.

4. An optical pickup device according to claim 2, wherein the objective lens is arranged on the rotation axis connecting the support points or in the vicinity of the rotation axis.

5. An optical pickup device according to claim 1, further comprising a mirror provided on the optical base and adapted to reflect light, which is emitted in parallel to the optical disk from a light source, in a direction perpendicular to the optical disk, wherein the support points are arranged such that the rotation axis connecting the support points is situated between an optical path extending from the light source to the mirror and a lower surface of a cartridge housing the optical disk.

6. An optical pickup device according to claim 1, wherein the lens holding body has a coil firmly attached thereto for moving the objective lens in at least one of the focusing direction and the tracking direction, and wherein the support body has a magnet fixed thereto for applying a magnetic field to the coil.

7. An optical pickup device according to claim 6, wherein the support body is composed of a support member for supporting the lens holding body so as to allow the lens holding body to move in at least one of the focusing direction and the tracking direction of the objective lens; and a base member fixedly supporting the support member and the magnet.

8. An optical pickup device according to claim 7, wherein at least a part of the base is constituted of a yoke forming a magnetic circuit together with the magnet.

9. An optical pickup device according to claim 1, wherein the optical base is mounted with a motor and a drive member which is in contact with the support body and which converts a torque of the motor to a driving force for vertically moving a part of the support body, the support body being rotated around the rotation axis by vertically moving the part of the support body.

10. An optical pickup device according to claim 9, wherein the motor is arranged such that its rotation shaft is parallel to a radial direction of the optical disk, and wherein the drive member is arranged in a direction perpendicular to the radial direction of the optical disk.

11. An optical pickup device according to claim 10, wherein the drive member is arranged on a side portion of the optical base.

12. An optical pickup device according to claim 9, wherein the drive member converts the torque of the motor to a reciprocating motion in a tangential direction of the optical disk, and wherein the drive member has at an end thereof an inclined portion for converting the reciprocating motion to a vertical motion, with the inclined portion being in contact with the part of the support body.

13. An optical pickup device according to claim 9, wherein a first gear is provided at a forward end of the rotation shaft of the motor, and wherein the drive member has at one end a second gear connected to the first gear and at the other end an eccentric cam in contact with the one end of the support member, with the eccentric cam being in contact with the part of the support body.

14. An optical pickup device according to claim 1, wherein at least one of the support points allows height adjustment in an optical axis direction of the objective lens.

15. An optical disk recording-reproducing apparatus equipped with an optical pickup device according to claim 1.

* * * * *